US009734281B2

(12) United States Patent
Jiang et al.

(10) Patent No.: US 9,734,281 B2
(45) Date of Patent: *Aug. 15, 2017

(54) PLASTIC PACKAGING MATERIALS TESTING SYSTEM BASED ON INTERNET OF THINGS AND CLOUD TECHNOLOGY

(71) Applicant: Labthink Instruments Co., Ltd., Jinan, Shandong Province (CN)

(72) Inventors: Haimo Jiang, Jinan (CN); Yunzhong Jiang, Jinan (CN)

(73) Assignee: Labthink Instruments Co., Ltd., Jinan, Shandong Province (CN)

( * ) Notice: Subject to any disclaimer, the term of this patent is extended or adjusted under 35 U.S.C. 154(b) by 1095 days.

This patent is subject to a terminal disclaimer.

(21) Appl. No.: 13/657,414

(22) Filed: Oct. 22, 2012

(65) Prior Publication Data
US 2013/0289925 A1 Oct. 31, 2013

Related U.S. Application Data

(63) Continuation of application No. 13/513,501, filed as application No. PCT/CN2012/000575 on May 2, 2012.

(30) Foreign Application Priority Data

Apr. 27, 2012 (CN) .......................... 2012 1 01269726
Apr. 27, 2012 (CN) .......................... 2012 2 01843453

(51) Int. Cl.
G06F 19/00 (2011.01)
G06G 99/00 (2009.01)
G06Q 10/06 (2012.01)

(52) U.S. Cl.
CPC ............. G06F 19/00 (2013.01); G06G 99/00 (2013.01); G06Q 10/06 (2013.01)

(58) Field of Classification Search
CPC ................................ G06G 99/00; G06F 19/00
See application file for complete search history.

(56) References Cited

U.S. PATENT DOCUMENTS 4,771,630 A * 9/1988 Croce .................. G01M 3/363
73/49.3
5,918,191 A   6/1999 Patel
(Continued)

FOREIGN PATENT DOCUMENTS

CN         101986321 A       3/2011
CN         201867814         6/2011
(Continued)

OTHER PUBLICATIONS

Chinese International Search Report from corresponding Chinese Application No. PCT/CN2012/000575.
(Continued)

Primary Examiner — Hyun Park
Assistant Examiner — Liam R Casey
(74) Attorney, Agent, or Firm — Hamilton, Brook, Smith & Reynolds, P.C.

(57) ABSTRACT

The invention discloses a plastic packaging material testing system and method based on internet of things and cloud technology. It includes: cloud computing center, this system module achieves the data communication, data storage and data processing between the customers and testing laboratory. There is public or private cloud for cloud computing center. For the private cloud, data will be stored as a separated group of data in the database server based on the private infrastructure which is provided by the system provider. The system provider provides the most effective control of data, data security and the service quality. For the public cloud, system provider ensures the system running (Continued)

and provides the data service by renting available cloud which is provided by the third party provider.

27 Claims, 7 Drawing Sheets

(56) References Cited

U.S. PATENT DOCUMENTS

| | | | | |
|---|---|---|---|---|
| 5,918,591 | A * | 7/1999 | Vollmar | F23N 5/247 122/11 |
| 6,560,546 | B1 | 5/2003 | Shenk et al. | |
| 7,460,473 | B1 * | 12/2008 | Kodama | H04L 47/10 370/230 |
| 2004/0177368 | A1 * | 9/2004 | Pelkey | H04N 7/162 725/25 |
| 2005/0066355 | A1 | 3/2005 | Cromer et al. | |
| 2006/0179081 | A1 * | 8/2006 | Vedula | G06F 11/2097 |
| 2009/0265137 | A1 * | 10/2009 | Iida | G06F 11/2294 702/183 |
| 2009/0300437 | A1 * | 12/2009 | Bhame | H04L 45/00 714/57 |
| 2009/0322482 | A1 * | 12/2009 | Schuessler | H04Q 9/00 340/10.1 |
| 2010/0014444 | A1 * | 1/2010 | Ghanadan | H04W 40/26 370/310 |
| 2010/0309384 | A1 * | 12/2010 | Asjadi | H04L 27/2605 348/725 |
| 2011/0180616 | A1 * | 7/2011 | Ito | G06K 19/06028 235/494 |
| 2012/0041783 | A1 * | 2/2012 | McKee | G06F 19/322 705/3 |
| 2012/0227004 | A1 * | 9/2012 | Madireddi | G06Q 10/06 715/771 |
| 2013/0218978 | A1 * | 8/2013 | Weinstein | H04L 65/403 709/205 |
| 2013/0289924 | A1 | 10/2013 | Jiang | |

FOREIGN PATENT DOCUMENTS

| | | |
|---|---|---|
| CN | 102196539 A | 9/2011 |
| CN | 102238026 A | 11/2011 |
| CN | 102281285 | 12/2011 |

OTHER PUBLICATIONS

Allen, D., "Plastic Technologies Inc. Opens Closure-Testing Lab", Jun. 21, 2011. [Retrieved from Internet on Sep. 21, 2015], Retrieved from Internet URL: http://www.pmpnews.com/news/plastic-technologies-inc-opens-closure-testing-lab.

Wahab, M.H.A., et al., "Web-Based Laboratory Equipment Monitoring System Using RFID," Jun. 2010, 2010 International Conference on Intelligent and Advanced Systems (ICIAS).

Mattern, F. and Floerkemeier, C., "From the Internet of Computers to the Internet of Things", From Active Data Management to Even-Based Systems and More, Sachs, K. et al., Eds (Berlin, Springer, 2010) pp. 242-259.

Nishikiori, M., "Enterprise Portal for Internet Business", *Fujitsu Sci. Tech. J.*, 36(2): 211-217 (Dec. 2000).

U.S. Office Action dated Oct. 8, 2015 from U.S. Appl. No. 13/513,501 entitled "Plastic Packaging Materials Testing System Based on Internet of Things and Cloud Technology".

Office Action for U.S. Appl. No. 13/513,501, dated May 6, 2016*.

Office Action for U.S. Appl. No. 13/513,501, dated Sep. 19, 2016.

\* cited by examiner

PLASTIC PACKAGING MATERIALS TESTING SYSTEM BASED ON INTERNET OF THINGS AND CLOUD TECHNOLOGY

RELATED APPLICATION(S)

This application is a continuation of U.S. application Ser. No. 13/513,501, filed Jun. 1, 2012, which is the U.S. National Stage of International Application No. PCT/CN2012/000575, filed on May 2, 2012, published in Chinese, which claims foreign priority to Chinese Patent Application No. CN 2012-101269726, filed Apr. 27, 2012 and also claims foreign priority to Chinese Patent Application No. CN 2012-201843453, filed Apr. 27, 2012. The entire teachings of the above applications are incorporated herein by reference.

FIELD OF THE INVENTION

The invention discloses a plastic packaging testing technology especially relates to a type of packaging materials testing system which based on internet of things and cloud technology.

BACKGROUND OF THE INVENTION

With the continuous progress of the social economy and technology, requirements of the packaging quality as well as the packing material properties and safety requirements are getting higher and higher. In order to ensure the stability of packaging properties, packaging materials testing industry was born. The plastic packaging materials testing is one important field of packaging materials testing.

At present, enterprises or organizations that have the testing needs for the plastic packaging materials are usually faced with two alternatives, one is purchasing testing instruments and building the laboratory by themselves; second is sending the samples to the government testing agencies or other third party inspection organization to obtain the final test results.

The first way, building laboratory with their own testing instruments for testing can be applied in the testing of daily production and quality control. But this operational mode needs enterprises to invest a lot of money to purchase testing instruments, train the laboratory technicians with professional testing skills, and finally complete the construction of the laboratory. This kind of investment with massive financial resources, manpower and material resources is only suitable for the Large-scale or High-income enterprises. It is not affordable for the small or medium-scale enterprises.

For the companies which have the ability to build their own laboratories, among currently available packaging materials testing instruments in the market, the good and bad are intermingled. Most of the testing instruments still remain in the level of the single chip microcomputer control system. The vast majorities of testing instruments are designed and applied for a single testing instrument purpose. It can only input the testing result for a single test, store a few data and output a few charts. Therefore the currently available testing instruments cannot meet the requirements for massive historical data storage and analysis. So far, in the plastic packaging testing industry, no one ever be able to provide the massive historical data storage and analysis, as well as the internet applications for the test data.

The second way, third party testing, due to its high cost and long period characteristics (through communication, counter to fill orders, reported receiving and so on), is generally used for taking evidence for product quality disputes and cause analysis of product quality problem. It is rarely used in the quality control daily production. At present, although some leading testing service providers are gradually implementing e-commerce technology to improve the efficiency and convenience of all aspects. But is still cannot fundamentally change its service mode and scope of applications.

Either the enterprise self-build or the third-party testing laboratory is the traditional testing laboratory. In the traditional laboratories, when the tests are completed, the laboratory technician will collect and record the testing data from the testing instruments to prepare the test report (i.e., testing report). When making the testing report, the laboratory technicians also need to calculate and process the test data after recorded from the instruments. All these operations can only be completed manually in the traditional testing industry. The current laboratory management systems which are used in packing testing industry can do the storage and management of the test reports. But all of the test data in the laboratory management systems are input manually. The laboratory management systems only achieve converting paper reports into electronic reports and store them, but did not realize the true sense of the automatic data processing and reports generating.

SUMMARY OF THE INVENTION

The purpose of this invention is to solve the problems that current testing instruments cannot automatically process the testing data, continuously store the data and automatically analyze the data because of the backward technology and design. It also solves the problems that enterprises need big investment for laboratory construction or problems caused by long cycle, high cost, inconvenient operation to entrusting third party testing organizations. This invention provides a packaging material testing system which is based on internet of things and cloud technology. The system integrated the test methods, testing instruments and network technology to solve the problems of data storage an application if internet technology which the existing instruments cannot solve. It also can avoid the big investment for building the laboratories with their own testing instruments and provide short cycle, low cost, self-help novel plastic packaging material testing services which the third party institutions cannot do. This invention embodies the inestimable social value in improving product quality and ensuring the safety and hygiene of food and medicines.

The objective of the invention is achieved by adopting the following technical solution:

A plastic packaging material testing system which based on internet of things and cloud technology comprises at least one remote testing laboratory system and a cloud computing center (i.e., a cloud computing data system) in which, Remote testing laboratory system includes:

A number of test units, each test unit have at least one packing material testing instrument. There is the only identification code in the world for each testing instrument which has been embedded in the instrument. The identification code contains the manufacturer information, instrument information and batch information, the identification code is preset in the memory of the packaging material testing instrument; The sensor group and data transceiver modules I are equipped in the packaging materials testing instrument. The sensor group detects the working environment of the testing instrument. The testing instrument tests the packaging materials, stores the test data in original encoding format and transmits the data via the transceiver module I.

At least one data acquisition server, the data acquisition server has a data transceiver module II. Data acquisition server receives the original encoding data sent out by the test units via the data transceiver module II and processes it. It achieves the automatic collection, storage, analysis of the working environment data and the test data. The data acquisition server is connected with cloud computing center.

There are two kinds of cloud computing center (i.e., a cloud computing data system):

Private cloud or/and public cloud, for the private cloud, data will be stored as a separated group of data in the database server based on the private infrastructure which is provided by the system provider. The system provider provides the most effective control of data, data security and the service quality; For the public cloud, system provider ensure the system running and provides the data service by renting available cloud which is provided by the third party provider.

Cloud computing center completes the data communication, data storage, data processing, report downloading and page displaying between customers and remove laboratory system.

The sensor group comprises at least one sensor of temperature, humidity, weight, pressure, oxygen, water, vibration, inclination, distance, force, current, voltage and speed. The sensors are connected with the amplifying circuit. The amplifying circuit amplifies the original signal outputted by the sensors and sends to A/D conversion circuit. The A/D conversion circuit is connected with the CPU of the packaging material testing instrument. The packaging materials testing instrument is connected with the monitor. The CPU of the testing instrument is connected with the data transceiver module I.

The data acquisition server includes:

A data parsing unit, which receives the original encoding data and parses them into readable data.

A secondary data storage unit, which stores the readable data,

A data compiling and reporting unit, which sends the readable data to the cloud computing center.

The packaging material testing instruments refers to at least one of the following: tensile tester, tear tester, oxygen permeability tester, water vapor permeability tester of seal tester; The data transceiver module I, II are wired network module or wireless network module, in which, the wireless network module refers to one of the following: Zigbee, Bluetooth, GPRS, 3G, 4G, WIFI or CDMA module.

The cloud computer center includes:

Remote laboratory (i.e., remote testing laboratory) system service module. This module collects the testing requirement information from customers.

Data acquisition, storage and management system module. This module receives the readable data which is uploaded by the remote laboratory system when tests complete, and then completes the data storage and the data management.

Automatic reports generating system module, this module obtains test data from the data acquisition, storage and management system module and processes the data according to the report requirements which is received from the remote laboratory system. Finally this module generates the test reports and analysis reports for customers to download. At the same time the reports will be sent to the remote laboratory system.

The remote laboratory system service module includes:

Customer self-help laboratory management module. In this module customers can perform the basic data management for the remote testing laboratory system, which includes enterprise portal settings, enterprise electronic account management, supplier management, packaging material information management, laboratory user's account (i.e., enterprise user account) and access permission (i.e., user account privileges) management.

Data service sub-module. In this module customers submit their testing requirements, track the testing applications, view or download test reports and analysis reports.

Testing laboratory management sub-module. In this module, the remote testing laboratory system completes laboratory user (i.e., laboratory technician) accounts and access permission settings, laboratory instruments information settings, laboratory testing items settings, expense standard settings, samples receiving, sampling, testing operation, reports management, customer information management, statistical analysis of the laboratory efficiency.

The data acquisition, storage and management system module includes:

Data synchronization and parsing unit sub-module. It receives the original encoding test data from the remote laboratory system automatically.

The raw test data storage sub-module. It stores the received test data.

The management and business data storage sub-module. It stores and manages the business datum of the remote laboratory system.

Automatic reports generating system module includes:

Reports request and service interface sub-module. It receives the report requests that customers submitted in the remote laboratory service module.

Automatic report generation sub-module. It processes the testing data and generates test reports.

Template preparation and management sub-module. It makes and manages the templates which are required for the test reports and the analysis reports.

The original encoding data will be packaged according to three types of data, one is equipment data frame, it mainly includes the sensor information; the second is information acquisition device communication frame, it contains test parameters and other information data which is collected by the auxiliary information acquisition system; the third is control frame, this frame makes data server control the equipment by using line directives.

(1). Equipment data frame: the frame head includes a frame sync byte, equipment ID, test ID, test type information. Data section is divided into four parts according to different reported information, which are "equipment information", "testing parameters", "real-time data", "testing results". Each part of information choose a variety of frames format according to the reported specific content and each frame format is distinguished by "feature coding"; The frame tail saves the verification code which is the result of exclusive-OR operation of this frame byte-by-byte except for the frame tail.

(2). Information acquisition equipment communication frame: It also consists of three parts, which are "frame head", "data" and "frame tail". The frame head part includes a frame synch byte, equipment ID, test ID, equipment type, reserved information, feature coding information. The data part contains sample information and operator information. They are sent to the data acquisition server and the test instrument. The frame tail saves the verification code which is the result of exclusive-OR operation of this frame byte-by-byte except for the frame tail.

(3). Control frame: the frame head contains frame sync byte, server ID, target instrument ID, reserved information, feature coding information; Data section issues instructions which include instrument shutdown, call instrument time, set instrument time, call instrument sensor, switch information, switch control, call instrument parameters, start or stop tests, call instrument log file; The frame tail saves the verification code which is the result of exclusive-OR operation of this frame byte-by-byte except for the frame tail.

A plastic packaging material testing method based on internet of things and cloud technology. The process is:

Step 1, Laboratory and system hardware configurations.

Set up the remote laboratory system and equipped it with the packaging material testing instruments which has the function of internet of things.

Step 2, Network and software system configurations

Log on the cloud computing center. Configure basic data such as customer account (i.e., enterprise administrator account), laboratory technician account, laboratory instruments information, laboratory test items information, expenses standard.

Step 3, Information set of customer's laboratory

Customer logs on the cloud computing center with their account and configures laboratory portal (i.e., enterprise portal), member account (i.e., enterprise user account), suppliers' information, testing materials' information, electronic account information.

Step 4 Submit testing applications

Customer logs on the cloud computer center, submits the testing applications and sends the materials to the remote laboratory by delivery.

Step 5 Remote testing laboratories conduct tests

After receiving testing materials from logistics, testing laboratory log o the cloud computer center, makes samples and conducts the tests in accordance with customer's requirements.

Step 6 Testing data acquisition, transmission and parsing

After the test begins, the remote laboratory system which has function of internet of things collects, analyzes, stores the testing data and sends the testing data to the data acquisition, storage, management system sub-module for data synchronization and storage.

Step 7 Automatic report generation.

After the data parsing is completed, automatic reports generation system module of cloud computing center makes test reports according to the templates, sends the report to the customers' interface when reports are completed, and deducts the reports' expense from customer's electronic accounts.

Step 8, testing reports download

Customers log on the cloud computing center and download the test report.

The business implementation process of the said step 2 to step 8 is:

Step 501, Enterprises who have the testing needs become customers of the remote laboratory system.

Step 502 Administrator of remote laboratory system logs on the system and sets up the laboratory administrator accounts for customers.

Step 503 Customers log on the system with the administrator account to configure the enterprise laboratory portal, user accounts and access permissions, supplier information, testing materials, and electronic account information.

Step 504 Customers sample the materials and pack them when they have testing needs.

Step 505 Customers log on the cloud computing center, access the data service sub-module, complete testing order, submit the demand for testing, and print the bar code of the testing order number, attached the bar code to the package of the samples.

Step 506 The samples is transmitted to the logistics for delivery.

Step 507 remote laboratory system receives the sample, and testing technician log in the cloud computing center, enter the laboratory management module, sign for the samples, prepare the samples for the test, and put the test samples to a packaging materials testing equipment, testing begins.

Step 508 Experiment implementation, packaging materials testing instruments do the testing job.

Step 509 After completion of test, report will be generated automatically, and the testing costs will be deducted automatically, too.

Step 510 Customers log on the cloud computing center, access the data service sub-module and download the test reports.

The data processing process of the said step 6 to step 8 is:

Step 601 After samples are put in the test instruments, packaging materials testing instruments start to collect the samples' information.

Step 602 During the testing process, packaging material testing instruments continuously store and transmit the original format testing data.

Step 603 The data acquisition server receives the original encoding testing data which is sent by the packaging material testing instruments.

Step 604, the data parsing unit of data acquisition server converts the original encoding testing data to readable data.

Step 605 The data acquisition server completes the storage of the readable data and sends them to the cloud computing center.

Step 606 data synchronization and parsing unit module of the cloud computing center receives the readable data sent by the data acquisition, compiling and reporting unit, and completes the storage and management of the readable data.

Step 607 After the data synchronization and parsing unit sub-module receives all the data, the automatic report generation module collects the test data from the raw test data storage sub-module, automatically completes the reports according to the testing report templates in the templates preparation and management sub-module, and sends the reports to the data service sub-module via the reports request and service interface sub-module.

Step 608, Customers log on the cloud computer center, access the data service sub-module and download the test reports.

The analysis reports generation process of the said step 7 to step 8 is:

Step 701 Customers log on the automatic generation system module and choose the needed analysis report template.

Step 702 Reports request and service interface sub-module receives the analysis request from the automatic reports generation system module.

Step 703 Automatic reports generation module collects the data which meets the analysis request from the raw test data storage sub-module according to the analysis request, processes and analyzes them. Then it generates analysis reports according to the report templates in the templates preparation and management module, transmits the analysis reports to the data service sub-module via the reports request and service interface module and deducts the reports' expense.

Step 704 Customers access the automatic report generation system module and download the analysis reports.

In this invention, the instruments adopt the bidirectional wireless communication to communicate with the data acquisition and reporting system, which supports for Zigbee and (or) Bluetooth and (or) of GPRS, CDMA, 3G three different means communication. It achieves automatic transmission of the testing data without human involvement; with technologies of interne of things and cloud computing, it achieves the bidirectional communication between the packaging materials testing instruments and the cloud computing center.

The automatic reports generation system has a reports request and reports service interface-unit. Via the said interface-unit, test reports are automatically generated in the reports generation system in accordance with the customers' requests submitted in the service system and transmitted to the customers' service system for users to view and download. There are some current existing electronic reports management systems. And these so-called electronic reports are generated by manually inputting the data into the system report templates. The report generation process of this automatic reports generation system is completed without human involvement. When testing instruments start to generate data, the data is acquired and stored by the data acquisition, management, storage system, and transmitted to reports generation system. Reports generation system makes the test reports by combining the data and the report template which are set in the report template management after receiving report request from the service system, and finally publishes to the customer service system for customers to view and download.

By adopting the bidirectional wireless communication technology used between the testing instruments and data acquisition, management, storage system, the real-time test data is transmitted to the customer service system in the form of real-time data report. Compared with traditional laboratory, customers not only can view test results, but also can have a detailed understanding of the test data during the whole test process through the real-time data report and control the whole test process.

In this system, automatic charging function is also added in. Customers have their own electronic accounts in their own enterprise portal. For customer's different testing needs, the expense is deducted according to the testing result. This so-called charging by the results is opposite to charging by the demands. For traditional third party testing service, when the customer submit the testing requirements (typically when send the test application to the testing institution) they should submit the testing expenses to the testing institution at the same time. However, in this system customers have certain available expenses in their own enterprise electronic accounts. When the testing report is submitted, the system calculates the expense and deducts it automatically according to the testing results, which achieves the purpose of charging by results. So customers do not have to make the payment every time when they submit the testing application. They only need to recharge your account regularly (or according to the system reminding).

Currently in the plastic packaging material testing industry, the ending of the testing is usually determined by the submitting of the test report. Every testing report exists as an individual unit, but if you gather all the individual units together, they will form a huge information cluster, from which you can dig out a log of valuable information. This system has a test data storage management unit, which stores the massive historical test data, compares or analyzes the data of the same or different materials and testing after receiving the analysis demands which customers submitted via the customers' service system and generates the analysis reports for the customers to view and download. Customers can use the analysis tools which are provided by the system to dig out valuable information from the whole data cluster and provide effective guidance for the enterprise to produce or choose packaging materials.

The beneficial effect of this invention is:
1. It solves the problem that enterprises have plastic packaging material testing demands but do not have the ability to build their own testing laboratory because of funds, technicians, space or other reasons. It allows customers to have their own remote laboratory to control the quality of packaging materials without investing a lot of money to buy testing instruments, train the technicians or build the laboratory.
2. It solves the problem that laboratory is unable to form data cluster for information mining because testing is ended with the testing report in the traditional laboratory. All testing data is stored, and managed in the system, and customers can analyze the testing data in multi-dimensional such as different suppliers and materials. This system provides valuable information and strong basis for customers to control or improve the products quality and also the business development.
3. It solves the problem that in the traditional laboratory the test data collecting, recording, calculation, processing and report generation must rely on manual operation. In this system, the data acquisition, transmission, processing and report generation are completed automatically. It reduces the human cost and time cost, and also greatly improves the accuracy of the test data.
4. The laboratory can get the real-time data of the complete testing process and control the whole testing process by the automatic acquisition and transmission of testing data, rather than just obtain test results. Thereby it provides the judgment basis for the effectiveness of the testing.
5. Usually, testing equipment manufacturers are only versed in testing technology and focus on how to manufacture high-precision instruments to make testing data. Testing institutions and testing service providers are only versed in managing the testing process and providing testing results (based on the conclusion of the testing data). Information system developers are only versed in information and software technology and know little about the testing technology and testing services. Therefore no one can be able to stand in a view of a number of professional points and make the pioneering thinking from the direction of the social benefit and industry progress. This is the basic reason why the two traditional testing modes, build laboratory by purchasing instruments and use the third party testing services, exist for several decades and no new innovation comes out. Of course, the fast development of cloud computing and networking technology is necessary condition for this invention. Therefore, the effective integration of this invention's perspective and a variety of professional technologies becomes quite difficult.
6. At present, packaging properties testing laboratories still remain in the stage of single operation, manual data processing and local applications. This invention combines several laboratories into a giant laboratory which has the capacity of cluster testing services through a series of effective integration of software and hardware systems and the developed modern logistics network. it also extends this laboratory's services areas to the internet and even in every corner of the world so that all the resources such as instruments in laboratory, human resources, storage space for testing data, software system operation and service capabilities could be expanded with new needs. And also this invention adds functions of distributed management of physical laboratories, automatic processing of laboratory test reports and cloud patterns of data service and so forth, so that the giant packaging testing laboratory cluster achieves the best resource utilization rate and maximum efficiency. This invention completely changes the management, functions and scope of services of traditional packaging testing laboratory and the way of resource allocation and information processing. It creates a new packaging testing laboratory with unified service and cluster management.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.
Description of the Diagrams

DETAILED DESCRIPTION OF THE INVENTION

A description of example embodiments of the invention follows.

The teachings of all patents, published applications and references cited herein are incorporated by reference in their entirety.

The invention is further illustrated with the attached diagrams and embodiments.

Figure 1:
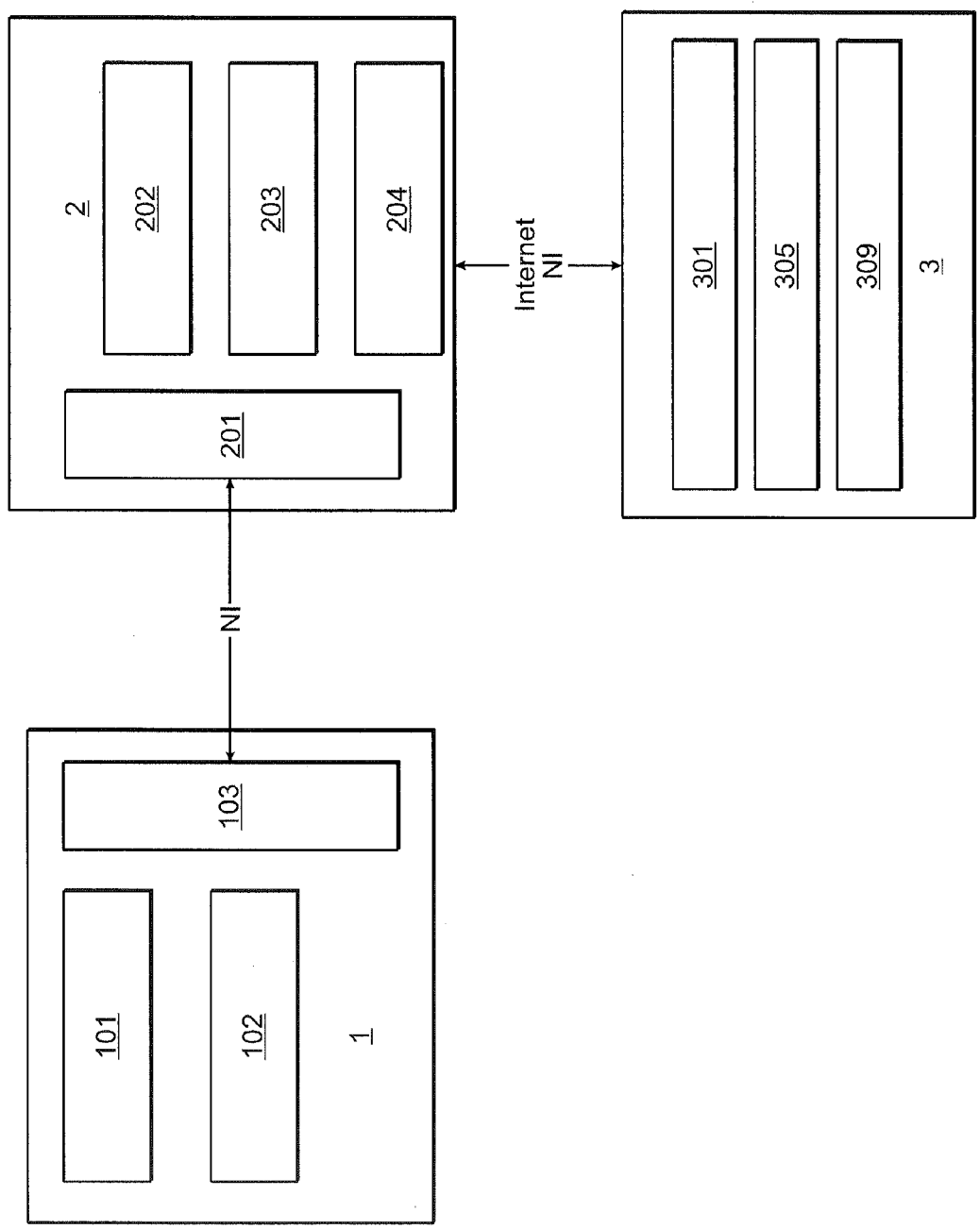
FIG. 1 shows the hardware system structure of this invention.
Figure 2:
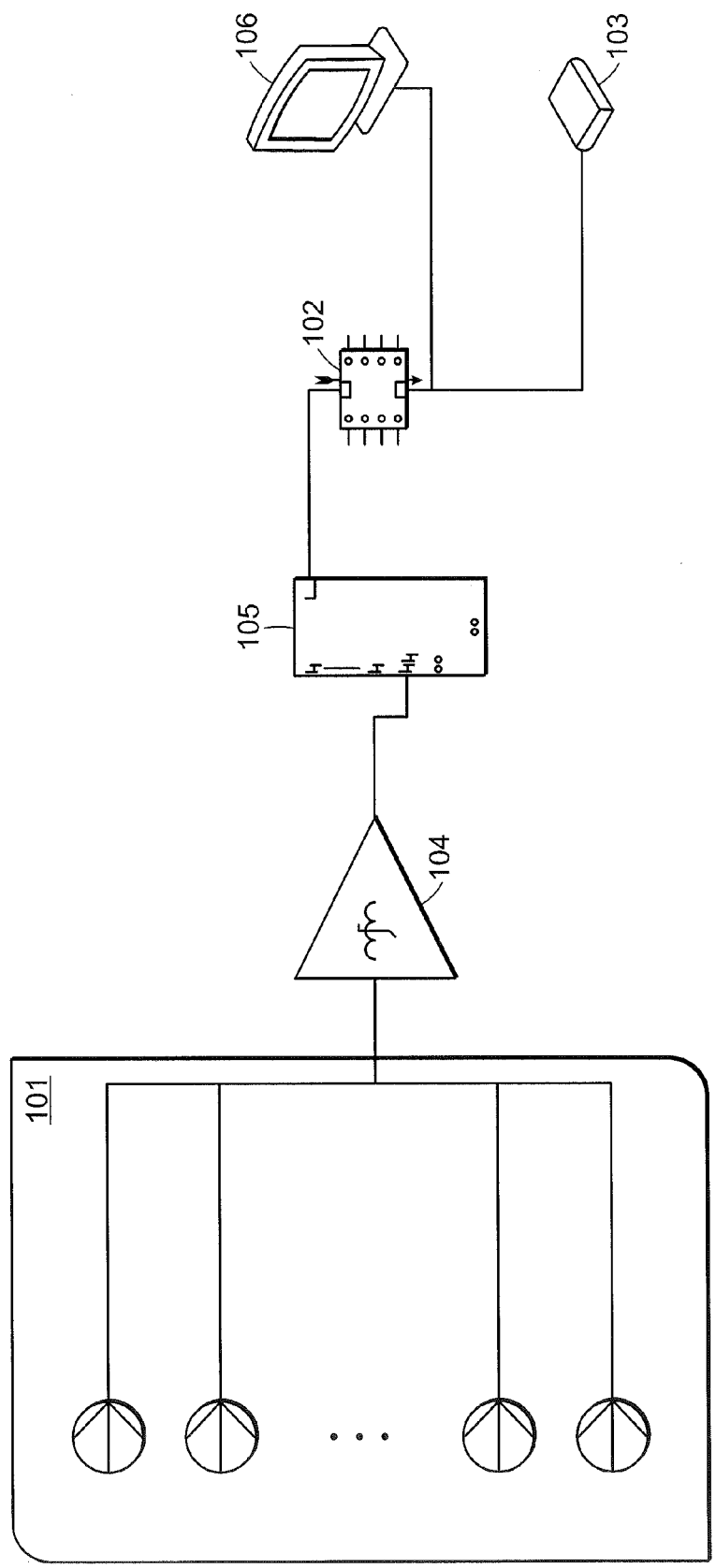
FIG. 2 shows the connection diagram of the sensor group and testing instrument.
Figure 3:
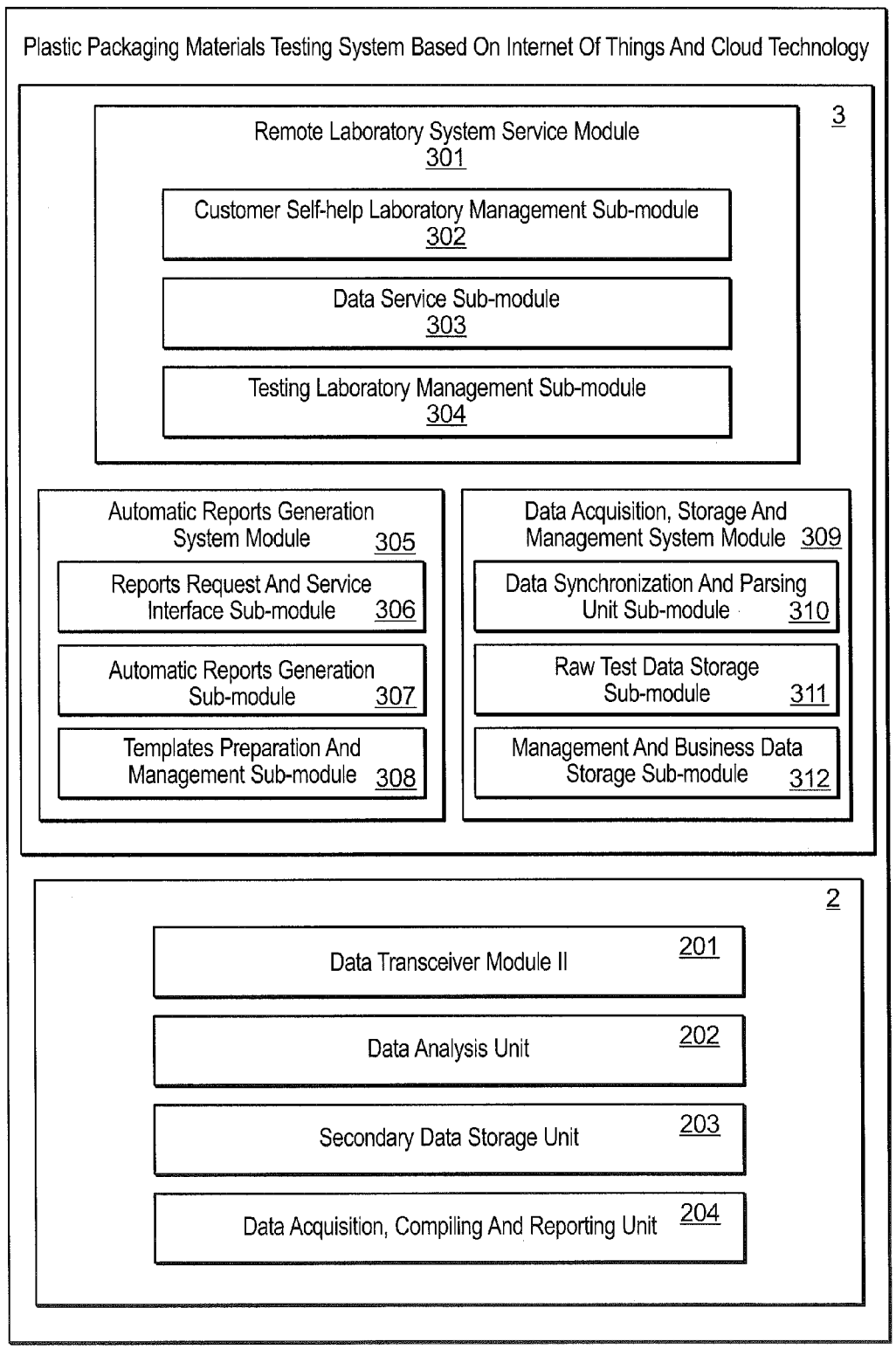
FIG. 3 shows the system module of this invention.
Figure 4:
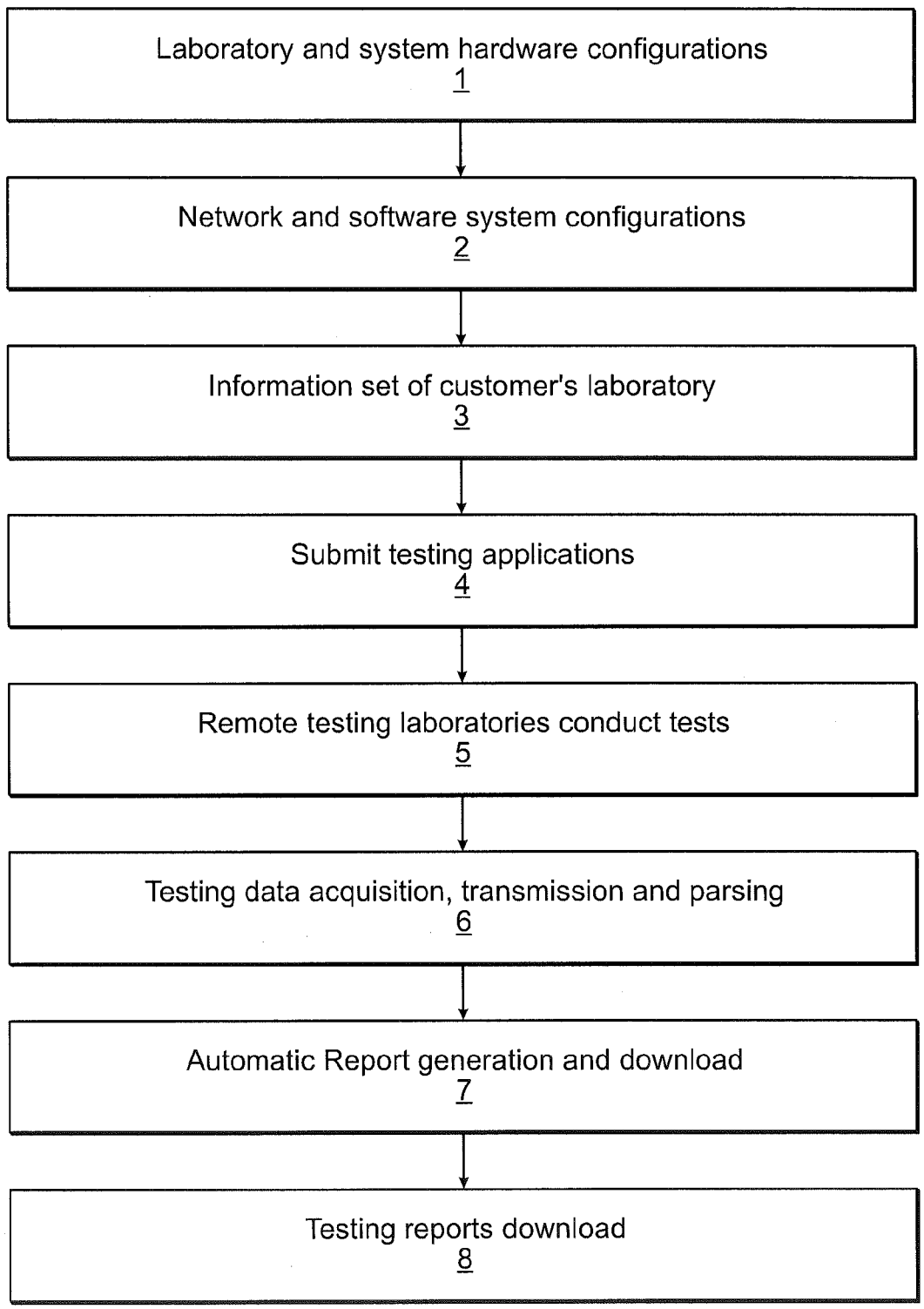
FIG. 4 shows the flow chart of this invention.
Figure 5:
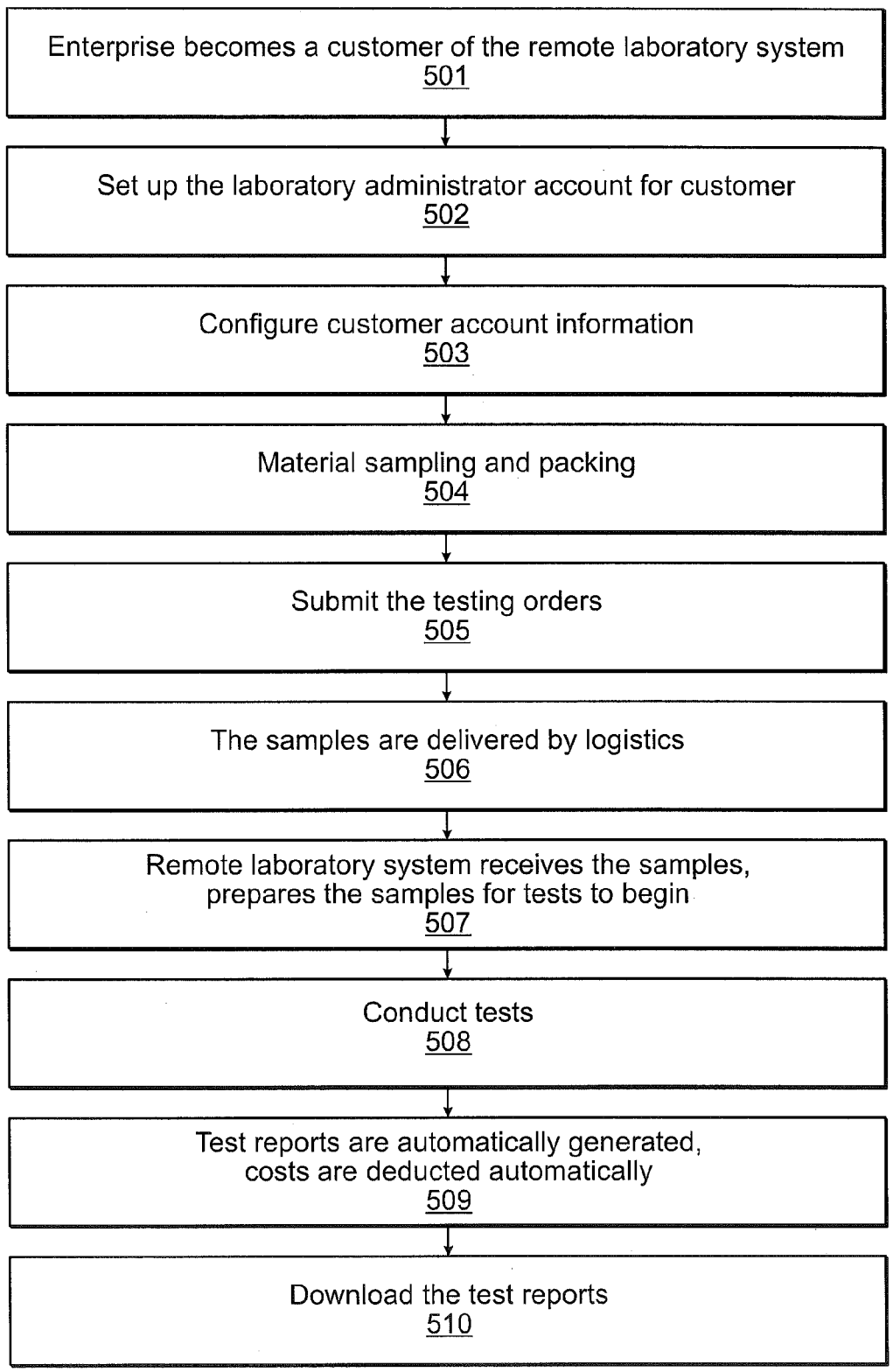
FIG. 5 shows the flow chart of business implementation.
Figure 6:
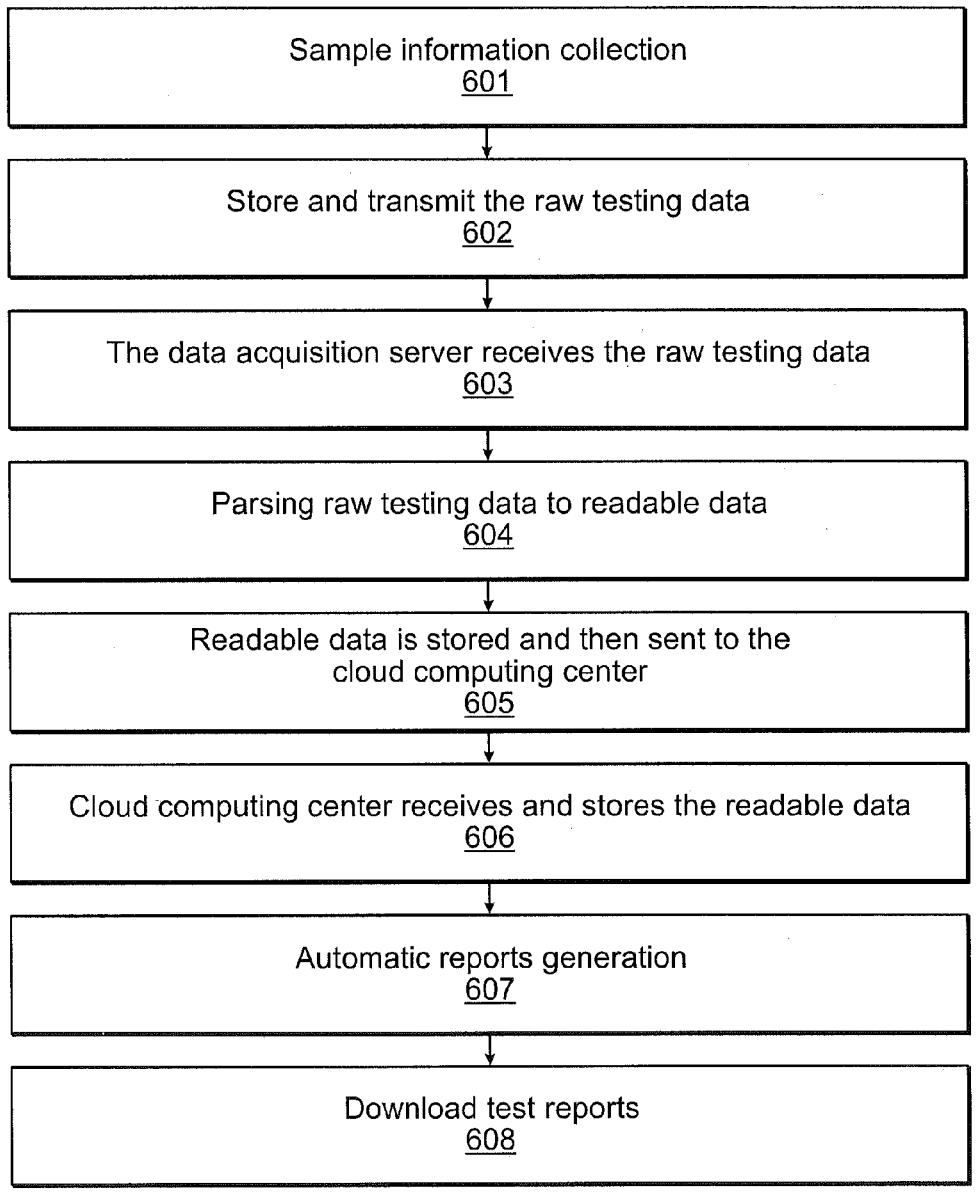
FIG. 6 shows data processing flow chart of this invention.
Figure 7:
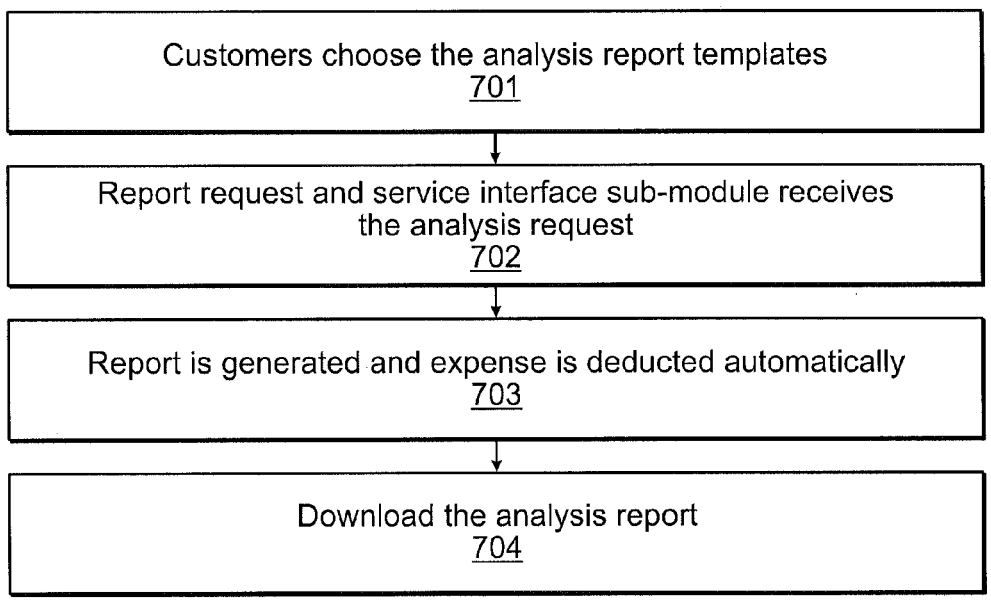
FIG. 7 shows analysis report generation flow chart of this invention.
Wherein, 1. Packaging material testing instrument, 2. Data acquisition server, 3. Cloud computing center, 101. Sensor group, 102. CPU, 103. Data transceiver module, 104 Amplifying circuit, 105. A/D conversion circuit, 106. Monitor, 201. Data transceiver module II, 202. Data analysis unit, 203. Secondary data storage unit, 204. Data acquisition, compiling and reporting system, 301. Remote laboratory system service module, 302. Customer self-help laboratory management sub-module, 303. Data service sub-module, 304. Testing laboratory management sub-module, 305. Automatic reports generation system module, 306. Reports request and service interface sub-module, 307. Automatic reports generation sub-module, 308. Templates preparation and management sub-module, 309. Data acquisition, storage and management system module, 310. Data synchronization and parsing unit sub-module, 311. Raw testing data storage sub-module, 312. Management and business data storage sub-module.

In FIG. 1 and FIG. 3, a plastic packaging material testing system which based on internet of things and cloud technology comprises at least one remote testing laboratory system and a cloud computing center 3 (i.e., a cloud computing data system).

In which,

Remote laboratory system includes:

A number of test units, each test unit have at least one packing material testing instrument 1. There is the only identification code in the world for each testing instrument 1 which has been embedded in the instrument 1. The identification code contains the manufacturer information, instrument information and batch information, the identification code is preset in the memory of the packaging material testing instrument; The sensor group 101 and data transceiver modules 103 are equipped in the packaging materials testing instrument 1. The sensor group 101 detects the working environment of the testing instrument 1. The testing instrument 1 tests the packaging materials, stores the test data in original encoding format and transmits the data via the transceiver module 103.

At least one data acquisition server 2, the data acquisition server 2 has a data transceiver module II 201. Data acquisition server 2 receives the original encoding data sent out by the test units via the data transceiver module II 201 and processes it. It achieves the automatic collection, storage, analysis of the working environment data and test data. The data acquisition server 2 is connected with cloud computing center 3.

There are two kinds of Cloud computing center 3.

Private cloud or/and public cloud, for the private cloud, data will be stored as a separated group of data in the database server based on the private infrastructure which is provided by the system provider. The system provider provides the most effective control of data, data security and the service quality. For the public cloud, the system provider ensures the system is running and provides data service by renting available cloud which is provided by the third party provider.

Cloud computing center 3 completes the data communication, data storage, data processing, report downloading and page displaying between customers and remote laboratory system.

In the diagram 2 the sensor group 101 comprises at least one sensor of temperature, humidity, weight, pressure, oxygen, water, vibration, inclination, distance, force, current, voltage and speed. The sensors are connected with the amplifying circuit 104. The amplifying circuit 104 amplifies the original signal outputted by the sensors and sends to A/D conversion circuit 105. The A/D conversion circuit 105 is connected with the CPU 102 of the packaging material testing instrument 1. The packaging materials testing instrument 1 is connected with the monitor 106. The CPU 102 of the testing instrument 1 is connected with the data transceiver module 103. Packaging materials testing instrument 1 collects the testing data through the sensor group 101 (includes at least one sensor). After amplified by the amplifying circuit 104, the data is sent to the A/D conversion circuit 105 to convert into high-precision digital signal. Then the converted digital signal is analyzed and processed by CPU 102. And the result will be displayed via the monitor 106, at the same time data transceiver module 103 completes data transmission.

The data acquisition server 2 includes:

A data parsing unit 202, which receives the original encoding data and parses them into readable format.

A secondary data storage unit 203, which stores the readable data;

A data compiling and reporting unit 204, which sends the readable data to the cloud computing center.

The packaging material testing instrument 1 refers to at least one of the following: tensile tester, tear tester, oxygen permeability tester, water vapor permeability tester or seal tester; The data transceiver module I, II are wired network module or wireless network module, in which, the wireless network module refers to one of the following: Zigbee, Bluetooth, GPRS, 3G, 4G, WIFI or CDMA module.

The cloud computing center 3 includes

Remote laboratory system service module 301. This module collects the testing requirement information from customers and sends the information to the data acquisition server 2 of the corresponding remote laboratory system.

Data acquisition, storage and management system module 309. This module receives the readable data which is uploaded by the remote laboratory system when tests complete, and then completes the data storage and the data management.

Automatic reports generating system module 305, this module obtains test data from the data acquisition, storage and management system module 309 and processes the data according to the report requirements which is received from the remote laboratory system. Finally this module generates the test reports and analysis reports for customers to download. At the same time the reports will be sent to the remote laboratory system.

The remote laboratory system service module 301 includes:

Customer self-help laboratory management sub-module 302. In this module customers can perform the basic data management for the remote testing laboratory system, which includes enterprise portal settings, enterprise electronic account management, supplier management, packaging material information management, laboratory users' account and access permission management.

Data service sub-module 303. In this module customers submit their testing requirements, track the testing applications, view or download test reports and analysis reports.

Testing laboratory management sub-module 304. In this module, the remote testing laboratory system completes laboratory user accounts and access permission settings, laboratory instruments information settings, laboratory testing items settings, expense standard settings, samples receiving, sampling, testing operation, reports management, customer information management, and statistical analysis of the laboratory efficiency.

The data acquisition, storage and management system module 309 includes:

Data synchronization and parsing unit sub-module 310. It receives the original encoding test data from the remote laboratory system automatically.

The raw testing data storage sub-module 311. It stores the received test data.

The management and business data storage sub-module 312. It stores and manages the business datum of the remote laboratory system.

The automatic reports generating system module 305 includes:

Reports request and service interface sub-module 306. It receives the report request that customers submitted in the remote laboratory service module.

Automatic reports generation sub-module 307. It processes the testing data and generates test reports.

Templates preparation and management sub-module 308. It makes and manages the templates which are required for the test reports and the analysis reports.

The original encoding data will be packaged according to three types of data, one is equipment data frame, it mainly includes the sensor information; the second is information acquisition device communication frame, it contains test parameters and other information data which is collected by the auxiliary information acquisition system; the third is control frame, this frame makes data server control the equipment by using line directives.

1. Equipment data frame: the frame head includes a frame sync byte, equipment ID, test ID, test type information. Data section is divided into four parts according to different reported information, which are "equipment information", "testing parameters", "real-time data", "testing results". Each part of information choose a variety of frames format according to the reported specific content and each frame format is distinguished by "feature coding"; The frame tail saves the verification code which is the result of exclusive-OR operation of this frame byte-by-byte except for the frame tail.
2. Information acquisition equipment communication frame: It also consists of three parts, which are "frame head", "data" and "frame tail". The frame head part includes a frame sync byte, equipment ID, test ID, equipment type, reserved information, feature coding information. The data part contains sample information and operator information. They are sent to the data acquisition server and the test instrument. The frame tail saves the verification code which is the result of exclusive-OR operation of this frame byte-by-byte except for the frame tail.
3. Control frame: the frame head contains frame sync byte, server ID<target instrument ID, reserved information, feature coding information; Data section issues instructions which include instrument shutdown, call instrument time, set instrument time, call instrument sensor, switch information, switch control, call instrument parameters, start or stop tests, call instrument log file; The frame tail saves the verification code which is the result of exclusive-OR operation of this frame byte-by-byte except for the frame tail.

In the invention, the relationship between the packaging material testing instrument 1 and the data acquisition server 2 which has the wireless data transceiving function can be N:1. That is to say, one data acquisition server 2 can communicate with a number of packaging material testing instruments 1 at the same time. This means that the remote laboratory systems can be different physical packaging testing laboratories in different locations and can be unlimited expanded and increased according to the demands of packaging testing business. And cloud computing center 3 does not need to change anything. Communication between the packaging material testing instrument and the data acquisition server adopts the wired or wireless mode. When the wireless mode is adopted, the wireless mode supports Zigbee and (or) Bluetooth and (or) of GPRS, CDMA, 3G, 4G and Wi-Fi and other means of communication. The data acquisition server 2 is a dedicated computer which is refitted with added data transceiver module 201, data acquisition, processing and reporting system module. Data acquisition, processing and reporting system includes a data parsing unit 202, secondary data storage unit 203, data compiling and reporting unit 204. In which, data parsing unit 202 parses the data sent over by packaging materials testing instrument 1 and store the data in the secondary data storage unit 203. According to the scheduling instructions sent over by cloud computing center 3, data acquisition server 2 performs the computing and pretreatment of the local data through data compiling and reporting unit 204 and also undertake a part of distributed computing tasks to relieve the operation pressure of the cloud computing center. When the data processing is completed, data compiling and reporting unit 204 selects data according to the reporting requirement and compresses the reported data losslessly through the data compression module. Data compression before reporting is to reduce the pressure of network bandwidth and improve the efficiency of data processing. Data compression adopts the Deflate algorithm.

In order to complete the dual-level network bidirectional communication between cloud computing center 3 and the packing material testing instrument 1 at the same time, each packaging material testing instrument 1 is embedded with the only global identification code before registered in the network. The identification code contains the manufacturer information, instrument information and batch information. The identification code is preset in the memory of the packaging material testing instrument and can also be used as system explanation and definition, so that system can be accessed by non-standard instruments of various types of manufacturers to unlimitedly expand the increasing requirements of testing items. Multilevel (in accordance with the design, the current application is two-level) network instrument-addressing mode allows the cloud computing center 3 to send instructions to the testing instrument correctly and discriminate testing data from different packaging materials testing instruments via the multilevel network. These technical supports allow a physical laboratory to increase or decrease testing instruments flexibly according to the business needs without affecting the entire system.

Cloud computing center uses virtualization technology to provide continuous expanding computer hardware resources. To build iaas (infrastructure as a service) platform to provide unlimited testing data storage space to expand service for customers. To build saas (software as a service) platform to provide remote package material testing laboratory service on the platform for enterprises. The service mode of this system refers to the cloud computing technology concepts. After submitting their testing applications online, customers only need to wait for the online service the testing data and results. Customers do not need to care about which laboratory completes the test, which instrument or which testing technician conducts the testing, where test data is stored. All those will be automatically completed by the system of this invention. The invention breaks through the bottleneck of internet of things of the testing instruments, which allows the test process data to be uploaded and acquired automatically. So in the test report and data analysis report process, the invention breaks through the existing mode that the generation of packaging materials testing laboratory test reports has to rely on manual editing or manual data uploading, and achieves the automatic test reports generation function through the predefined testing report templates and a certain mapping relations of the system data. That is to say, test reports can be generated automatically after test completes.

Diagram 4 is the flow chart of this invention, which include the following steps:

Step 1, Laboratory and system hardware configurations.

Set up the remote laboratory system and equipped it with the packaging material testing instruments which has the function of internet of things.

Step 2, Network and software system configuration

Log on the cloud computing center. Configure basic data such as customer account, laboratory technician account, laboratory instruments information, laboratory test items information, expenses standard.

Step 3, Information set of customer's laboratory

Customer logs on the cloud computing center with their account and configures laboratory portal, member account, suppliers' information, testing materials' information, electronic account information.

Step 4, Submit testing applications

Customer logs on the cloud computing center, submits the testing applications and sends the materials to the remote laboratory by delivery.

Step 5, Remote testing laboratories conduct tests

After receiving testing materials from logistics, testing laboratory log on the cloud computer center, makes samples and conducts the tests in accordance with customer's requirements.

Step 6, Testing data acquisition, transmission and parsing

After the test begins, the remote laboratory system which has function of internet things collects, analyzes, stores the testing data and sends the testing data to the data acquisition, storage and management system sub-module for data synchronization and storage.

Step 7, Automatic report generation.

After the data parsing is completed, automatic reports generation system module of cloud computing center makes test reports according to the templates, sends the report to the customer's interface when reports are completed, and deducts the reports' expense from customer's electronic accounts.

Step 8, testing reports download

Customers log on the cloud computing center and download the test report.

In the diagram 5, the business implementation process of the said step 2 to step 8 is:

Step 501, Enterprises who have the testing needs become customers of the remote laboratory system.

Step 502, Administrator of remote laboratory system logs on the system and sets up the laboratory administrator accounts for customers.

Step 503, Customers log on the system with the administrator account to configure the enterprise laboratory portal, user accounts and access permissions, supplier information, testing materials, and electronic account information.

Step 504, Customers sample the materials and pack them when they have testing needs.

Step 505, Customers log on the cloud computing center, access the data service sub-module, complete testing order, submit the demand for testing, and print the bar code of the testing order number, attached the bar code to the package of the samples.

Step 506, the samples is transmitted to the logistics for delivery.

Step 507, Remote laboratory system receives the sample, and testing technician log in the cloud computing center, enter the laboratory management module, sign for the samples, prepare the samples for the test, and put the test samples to a packaging materials testing equipment, testing begins.

Step 508, Experiment implementation, packaging materials testing instruments do the testing job.

Step 509, After completion of test, report will be generated automatically, and the testing costs will be deducted automatically, too.

Step 510, Customers log on the cloud computing center, access the data service sub-module and download the test reports.

In the diagram 6, the data processing process of the said step 6 to step 8 is:

Step 601, After samples are put in the test instruments, packaging materials testing instruments start to collect the samples' information.

Step 602, During the testing process, packaging material testing instruments continuously store and transmit the original format testing data.

Step 603, The data acquisition server receives the original encoding testing data which is sent by the packaging material testing instruments.

Step 604, The data parsing unit of data acquisition server converts the original encoding testing data to readable data.

Step 605, The data acquisition server completes the storage of the readable data and sends them to the cloud computing center.

Step 606, Data synchronization and parsing unit module of the cloud computing center receives the readable data sent by the data acquisition, compiling and reporting unit, and completes the storage and management of the readable data.

Step 607, After the data synchronization and parsing unit sub-module receives all the data, the automatic report generation module collects the test data from the raw test data storage sub-module, automatically completes the reports according to the testing report templates in the templates preparation and management sub-module, and sends the reports to the data service sub-module via the reports request and service interface sub-module.

Step 608, Customers log on the cloud computing center, access the data service sub-module and download the test reports.

In the diagram 7, the analysis reports generation process of the said step 7 to step 8 is:

Step 701, Customers log on the automatic reports generation system module and choose the needed analysis report template.

Step 702, Reports request and service interface module receives the analysis report from the automatic reports generation system module.

Step 703, Automatic reports generation module collects the data which meets the analysis request from the raw test data storage sub-module according to the analysis request, processes and analyzes them. Then it generates analysis reports according to the report templates in the templates preparation and management module, transmits the analysis reports to the data service sub-module via the reports request and service interface module and deducts the reports' expense.

Step 704, Customers access the automatic report generation system module and download the analysis reports.

While this invention has been particularly shown and described with reference to example embodiments thereof, it will be understood by those skilled in the art that various changes in form and details may be made therein without departing from the scope of the invention encompassed by the appended claims.

The relevant teachings of all references cited herein are incorporated by reference in their entirety.

What is claimed is:

1. A packaging material laboratory testing services order and fulfillment method, comprising the steps of:

a) through a computer communication service, enabling a customer to form and initialize a request for a laboratory test of packaging material, and sending the request to a cloud computing data system, wherein the cloud computing data system includes
  at least one of a private cloud and a public cloud, for the private cloud, data being stored as a separate group of data in a database server based on a private infrastructure which is provided by a system provider, the system provider providing control of data, data security and service quality, and for the public cloud, a system provider ensuring system running and providing data service from a third party provider,
  wherein the cloud computing center performs data communication, data storage, data processing, report downloading and page displaying between customers and the remote testing laboratory system, said forming and initializing the request including the steps of,
  i) the customer interacting with the cloud computing data system and entering request data, and
  ii) in response to the customer-entered request data, the cloud computing data system generating a bar code printable by the customer locally and representing a respective order for the laboratory test;
b) enabling receipt at a remote testing laboratory of a sample packaging material from the customer, with the received sample packaging material bearing the bar code as printed locally and used by the customer to submit the sample packaging material to the remote testing laboratory system, wherein the remote testing laboratory system includes:
  a number of test units, each test unit having at least one packaging material testing instrument embedded with an identification code, the identification code including manufacturer information, instrument information and batch information, the identification code being preset in a memory of the packaging material testing instrument, the packaging material testing instrument being coupled with a sensor group and a data transceiver module (I), the sensor group detecting working environment data of the packaging material testing instrument, the packaging material testing instrument testing packaging materials, storing test data in an encoding format and transmitting the test data via the data transceiver module I, and
  at least one data acquisition server, the data acquisition server having a data transceiver module (II), the data acquisition server receiving the test data in the encoding format sent out by the test units via the data transceiver module II and processing the test data, the data acquisition server achieving automatic collection, storage, analysis of the working environment data and the test data, the data acquisition server being connected with the cloud computing center,
  wherein the test data in the encoding format is packaged according to an equipment data frame that includes sensor information, an information acquisition device communication frame that includes test parameters and other information data which is collected by auxiliary information acquisition system, and a control frame that makes a data server control equipment test units by using line directives, wherein
  in the equipment data frame, a frame head includes a frame sync byte, and bytes representing equipment ID, test ID, and test type information, a data section is formed of a plurality of bytes divided into four parts according to different reported information, which are equipment information, testing parameters, real-time data, and testing results, each part having a variety of frame formats according to specific content in the reported information and the frame formats being distinguishable from one another by feature coding within the frame head, and a frame tail saves a verification code which is a result of exclusive OR operation of the bytes of the frame head and data section byte-by-byte;

the information acquisition device communication frame includes three parts, which are a frame head, data and frame tail, wherein the frame head part includes a frame sync byte, and bytes representing equipment ID, test ID, equipment type, reserved information, and frame format coding information, the data part contains bytes representing sample information and operator information that are sent to the data acquisition server and the test units, and the frame tail saves a verification code which is a result of exclusive OR operation of the bytes of the frame head part and the data part byte-by-byte; and in the control frame, a frame head includes a frame sync byte, and bytes representing server ID, target instrument ID, reserved information, and feature code information, a data section is formed of a plurality of bytes holding instructions, and issues the instructions which include instrument shutdown, call instrument time, set instrument time, call instrument sensor, switch information, switch control, call instrument parameters, start or stop tests, and call instrument log file, and the frame tail saves a verification code which is a result of exclusive OR operation of the bytes of the control frame byte-by-byte; and whereby a testing instrument at the remote testing laboratory is employed to conduct a laboratory test run on the sample packaging material as requested by the customer to thereby generate test data; and c) automatically uploading to the cloud computing data system the test data resulting from the laboratory test run on the received sample packaging material and, in response to the upload, the cloud computing data system thereafter automatically collecting, storing and analyzing the test data and making the test data available to the customer in fulfillment of the order for the laboratory test.

2. The method as claimed in claim 1, further comprising the steps of:
a) performing at least one of basic data management, the basic data management including computer software for navigation of directories, enterprise electronic account management, supplier management, packaging material information management; management of a an enterprise user account; and user account privileges management; and
b) conducting at least one of submitting testing requirements, tracking testing applications, and viewing and/ or downloading the test reports or analysis reports.

3. The method of claim 1, wherein the packaging material being tested is plastic.

4. The method as claimed in claim 3, further comprising through the cloud computing data system the steps of:
a) configuring enterprise administrator account and account privilege settings, laboratory technician accounts and technician account privilege settings, laboratory instrument information settings, laboratory testing items settings, and expense standard settings;
b) receiving sample packaging materials, sampling and performing testing operations;
c) managing at least one of test reports and analysis reports;
d) managing customer information; and
e) performing statistical analysis of laboratory efficiency.

5. A method as claimed in claim 3, wherein the sample packaging material is plastic, and the method further comprises the steps of:
at the remote testing laboratory,
a) testing at least one of the sample packaging material and the testing environment of the packaging material to thereby obtain test data relating to the sample packaging material;
b) encoding the test data at the testing instrument;
c) storing the encoded test data at the testing instrument;
d) transmitting the encoded test data from the testing instrument to a data acquisition server;
e) parsing the encoded test data into readable test data and storing the readable test data at the local data acquisition server; and
f) transmitting at least a portion of the readable test data to the cloud computing data system.

6. The method of claim 5, further including the steps of requesting an analysis report from the cloud computing data system, whereby the cloud computing data system prepares an analysis report from at least a portion of the readable test data.

7. The method of claim 6, wherein a test report is prepared by the cloud computing data system for the customer to download.

8. The method of claim 5, wherein the testing of the sample packaging material includes at least one member of the group consisting of tensile strength, tear strength, oxygen permeability, water vapor permeability and seal strength.

9. The method of claim 5, wherein the readable test data are transmitted to or from the data acquisition server by a wireless network.

10. The method of claim 5, wherein the readable test data are transmitted to or from the data acquisition server by a wired network.

11. The method of claim 5, further including the steps by the cloud computing data system of:
a) analyzing at least a portion of the readable test data collected from the local data acquisition server to generate analyzed data; and
b) the cloud computing data system generating an analysis report with the analyzed data.

12. The method as claimed in claim 11, wherein generating the analysis report with the analyzed data includes the steps of:
a) receiving report requests submitted by the customer;
b) processing the data; and
c) utilizing templates to generate the test report and analysis report.

13. The method as claimed in claim 12, further including the steps of:
a) the customer logging on to the cloud computing data system and choosing an analysis report template;
b) the cloud computing data system responsively receiving an analysis request;
c) the cloud computing data system collecting data which meets the analysis request, processing and analyzing the data, generating analysis reports according to report templates and deducting the reports' expense; and d) the customer accessing the cloud computing data system and downloading the analysis reports.

14. The method as claimed in claim 5, further comprising the steps of:

a) setting up the data acquisition server and equipping the data acquisition server with at least one packaging material testing instrument;

b) coupling the packaging testing material instrument to a communication service of things, whereby the packaging material testing instrument becomes a component of a communication service of things;

c) setting up a log-on to the cloud computing data system, and configuring basic data including enterprise administrator accounts, laboratory technician accounts, laboratory instruments information, laboratory test items information, and expenses;

d) setting up a testing service by configuring customer log-ons to the cloud computing data system with a respective enterprise administrator account and configuring computer software for navigation of directories, user accounts, suppliers information, testing materials information and electronic account information;

e) logging on to the cloud computing data system by the customer and subsequently submitting testing request, including sending materials for testing to the remote testing laboratory by the logistics network;

f) conducting tests including, after receiving materials for testing from the logistics network, the testing technician logging onto the cloud computing data system, making test samples and conducting tests in accordance with the customer's requirements;

g) after a test begins, collecting, storing and sending the test data to the data acquisition server for data synchronization, parsing and storage;

h) the cloud computing data system making test reports, sending the test reports to customer interfaces, and deducting report expenses from respective customer accounts; and i) logging onto the cloud computing data system by the customer and downloading the report.

15. The method as claimed in claim 14 further comprising the steps of:

enterprises that have testing needs becoming customers of the remote laboratory testing services, and enabling, a system administrator of the cloud computing data system logging on cloud computing data system and setting up a respective enterprise administrator account for said customers;

the customers logging on to the cloud computing data system with the respective enterprise administrator account to configure computer software for navigation of directories, user accounts and account privileges, supplier information, materials information, and electronic account information, wherein the customers specify a sample of packaging materials of interest and form a package of the sample materials when said customers have testing needs;

the customers logging on to the cloud computing data system, completing a testing order, submitting a demand for a certain test, printing a bar code indicative of the testing order, and attaching the printed bar code to the package of the sample materials, wherein the package of sample materials is transmitted to the logistics network for delivery;

the remote testing laboratory receiving the package of sample packaging materials, and a testing technician logging onto the cloud computing data system, signing for the sample packaging materials, preparing the sample packaging materials for the certain test, and providing test sample packaging materials to a packaging material testing instrument such that testing begins, wherein the packaging material testing instrument performs the certain test, and after said test is completed, a test report is automatically generated and testing costs are automatically deducted from the enterprise electronic account; and the customers logging onto the cloud computing data system and downloading the test reports.

16. The method as claimed in claim 14, further comprising the steps of:

a) initiating collection of raw test data;

b) during collection of test data, the packaging material testing instruments continuously storing and transmitting the raw test data in the encoded format, and the at least one data acquisition server receiving the raw test data in the encoded format as sent by the packaging material testing instruments;

c) the at least one data acquisition server converting the raw test data in the encoded format to readable data, and said data acquisition server completing storage of the readable data and sending the readable data to the cloud computing data system;

d) receiving readable data at the cloud computing data system sent by the data acquisition server, and performing storage and management of the readable data;

e) selectively collecting test data from the readable data and completing the report according to a report template for customer to download; and f) logging onto the cloud computing data system by a customer to download the test reports.

17. A method of providing packaging material testing comprising:

a) coupling a remote testing laboratory and a cloud computing data system, wherein the remote testing laboratory includes, at least one data acquisition server, and a number of test units, each test unit having at least one packaging material testing instrument embedded with an identification code, the identification code including manufacturer information, instrument information and batch information, the identification code being preset in a memory of the packaging material testing instrument the packaging material testing instrument being coupled with a sensor group and a data transceiver module (I), the sensor group detecting working environment data of the packaging material testing instrument, the packaging material testing instrument testing packaging materials, storing test data in an encoding format and transmitting the test data via the data transceiver module I, and at least one data acquisition server, the data acquisition server having a data transceiver module (II), the data acquisition server receiving the test data in the encoding format sent out by the test units via the data transceiver module II and processing the test data, the data acquisition server achieving automatic collection, storage, analysis of the working environment data and the test data, the data acquisition server being connected with the cloud computing center, wherein the test data in the encoding format is packaged according to an equipment data frame that includes sensor information, an information acquisition device communication frame that includes test parameters and other information data which is collected by auxiliary information acquisition system, and a control frame that makes a data server control equipment test units by using line directives, wherein in the equipment data frame, a frame head includes a frame sync byte, and bytes representing equipment ID, test ID, and test type information, a data section is formed of a plurality of bytes divided into four parts according to different reported information, which are equipment information, testing parameters, real-time data, and testing results, each part having a variety of frame formats according to specific content in the reported information and the frame formats being distinguishable from one another by feature coding within the frame head, and a frame tail saves a verification code which is a result of exclusive OR operation of the bytes of the frame head and data section byte-by-byte;

the information acquisition device communication frame includes three parts, which are a frame head, data and frame tail, wherein the frame head part includes a frame sync byte, and bytes representing equipment ID, test ID, equipment type, reserved information, and frame format coding information, the data part contains bytes representing sample information and operator information that are sent to the data acquisition server and the test units, and the frame tail saves a verification code which is a result of exclusive OR operation of the bytes of the frame head part and the data part byte-by-byte; and in the control frame, a frame head includes a frame sync byte, and bytes representing server ID, target instrument ID, reserved information, and feature code information, a data section is formed of a plurality of bytes holding instructions, and issues the instructions which include instrument shutdown, call instrument time, set instrument time, call instrument sensor, switch information, switch control, call instrument parameters, start or stop tests, and call instrument log file, and the frame tail saves a verification code which is a result of exclusive OR operation of the bytes of the control frame byte-by-byte; and b) for each packaging material testing instrument, detecting a testing environment of the packaging material testing instrument, said packaging material testing instrument testing packaging materials, storing test data in an encoding format and transmitting the test data;

c) using the at least one data acquisition server of the remote testing laboratory, automatically collecting, storing and parsing the testing environment data and the test data, wherein the at least one data acquisition server receives the test data in the encoding format sent by the test units and processes the test data, and wherein the at least one data acquisition server is connected for communication with the cloud computing data system; and d) performing through the cloud computing data system, data communication, data storage, data processing, report downloading and page displaying between customers and the cloud computing data system, wherein the cloud computing data system includes at least one of a private cloud and a public cloud, for the private cloud, data being stored as a separate group of data in a database server based on a private infrastructure which is provided by a system provider, the system provider providing control of data, data security and service quality, and for the public cloud, a system provider ensuring system running and providing data service from a third party provider, wherein the cloud computing center performs data communication, data storage, data processing, report downloading and page displaying between customers and the remote testing laboratory system.

18. The method of claim 17, further comprising, through the at least one data acquisition server:
receiving the test data in the encoding format and parsing the test data into a readable format;
storing the test data in the readable format; and
sending the test data in the readable format to the cloud computing data system.

19. The method as claimed in claim 17, wherein at least one of the packaging material testing instruments includes at least one of the following: a tensile tester, a tear tester, an oxygen permeability tester, a water vapor permeability tester or a seal tester.

20. The method as claimed in claim 17, further comprising:
through the cloud computing data system,
collecting testing requirement information from customers;
receiving readable data which is uploaded by the data acquisition server when tests complete, and performing data storage and data management of the readable data; and
accessing the readable data and processing the readable data according to report requirements received from the cloud computing data system, said processing generating test reports or analysis reports for customers to download.

21. The method as claimed in claim 20, further comprising:
enabling customers to perform basic data management, the basic data management including: settings of computer software for navigation of directories, enterprise electronic account management, supplier management, packaging material information management, enterprise user account and account privileges management; and
enabling customers to submit testing requirements, track testing applications, view and/or download the test reports and the analysis reports.

22. The method as claimed in claim 20, further comprising, through the cloud computing data system:
configuring laboratory technician accounts and account privilege settings, laboratory instruments information settings, laboratory testing items settings, and expense standard settings;
receiving samples, sampling and performing testing operations;
managing reports;
managing customer information; and
performing statistical analysis of laboratory efficiency.

23. The method as claimed in claim 20, wherein the processing to generate reports includes:
receiving report requests submitted by customers;
processing the testing data; and
utilizing templates to generate the test reports and the analysis reports.

24. The method as claimed in claim 23, further including the steps of:
  a subject customer logging on to cloud computing data system and choosing an analysis report template;
  the cloud computing data system responsively receiving an analysis request;
  the cloud computing data system collecting data which meets the analysis request, processing and analyzing the data, generating analysis reports according to report templates, and deducting the reports' expense; and
  the subject customer accessing the cloud computing data system and downloading the analysis reports.

25. The method as claimed in claim 17, further comprising:
  Step 1, setting up the remote testing laboratory and equipping the remote testing laboratory with the packaging material testing instruments coupled with a communication service of things;
  Step 2, configuring a log on to the cloud computing data system, and configuring basic data including an enterprise administrator account, a laboratory technician account, laboratory instruments information, laboratory test items information, and an expenses standard;
  Step 3, setting up a customer's laboratory by configuring a customer log on to the cloud computing data system with enterprise administrator account and configuring computer software for navigation of directories, user accounts, suppliers information, testing materials information and electronic account information;
  Step 4, enabling customer log on to the cloud computing data system and subsequent submission of testing applications including sending materials for testing to the remote testing laboratory by the logistics network;
  Step 5, conducting tests through the remote testing laboratory including:
    after receiving packaging materials for testing from the logistics network, the testing technician logging onto the cloud computing data system, making test samples and conducting tests in accordance with customer's requirements;
  Step 6, enabling the testing instrument, after a test begins, to collect, store and send the test data to the data acquisition server for data synchronization and storage;
  Step 7, the cloud computing data system making test reports, sending the test reports to customer interfaces, and deducting report expenses from customer electronic accounts; and
  Step 8, enabling customer logging onto the cloud computing data system and downloading the test reports.

26. The method as claimed in claim 25, further comprising the steps of:
  wherein enterprises that have testing needs become customers of the remote laboratory testing services, enabling:
  an administrator of the cloud computing data system to log on to the cloud computing data system and set up enterprise administrator accounts for said customers;
  the customers to log on to cloud computing data system with the enterprise administrator account to configure respective computer software for navigation of directories, user accounts and account privileges, supplier information, testing materials, and electronic account information, wherein the customers specify a sample of packaging materials of interest and form a package of the sample packaging materials when said customers have testing needs;
  the customers log on to the cloud computing data system, complete a testing order, submit a demand for a certain test, print a bar code indicative of the testing order, and attach the printed bar code to the package of the sample packaging materials, wherein the package of sample packaging materials is transmitted to the logistics network for delivery; and
  the remote testing laboratory to receive the package of sample packaging materials, and a testing technician to log into the cloud computing data system, sign for the sample packaging materials, prepare the sample packaging materials for the certain test, and provide test samples to a packaging material testing instrument such that testing begins, wherein the packaging material testing instrument performs the certain test, and after said test is completed, a test report is automatically generated and testing costs are automatically deducted, and
  wherein the customers log on the cloud computing data system and download the test reports.

27. The method as claimed in claim 25, further comprising the steps of:
  wherein after test sample package materials are put in the test units, corresponding packaging material testing instruments start to collect test sample information;
  wherein during the test, the packaging material testing instruments continuously store and transmit the test data in the encoding format, and the at least one data acquisition server receives the test data in the original encoding format as sent by the packaging material testing instruments;
  wherein a data parsing unit of the at least one data acquisition server converts the test data in the original encoding format to readable data, said data acquisition server completes storage of the readable data and sends the readable data to the cloud computing data system;
  wherein the cloud computing data system receives the readable data sent by the data acquisition server, and performs storage and management of the readable data;
  wherein after the cloud computing data system receives all the readable data, the cloud computing data system collects the test data, automatically completes the reports according to test report templates; and
  wherein the customers log onto the cloud computing data system to download the test reports.

* * * * *